(12) United States Patent
Kuzma et al.

(10) Patent No.: US 10,977,692 B2
(45) Date of Patent: Apr. 13, 2021

(54) DIGITAL ADVERTISING SYSTEM (71) Applicant: INTEL CORPORATION, Santa Clara, CA (US)

(72) Inventors: Andrew J. Kuzma, Portland, OR (US); Brad Vrabete, Sixmilebridge (RO); Addicam V. Sanjay, Gilbert, AZ (US); Shahzad A. Malik, Markham (CA); Abhishek Ranjan, Markham (CA); Shweta Phadnis, Chandler, AZ (US); Fengzhan Tian, Beijing (CN); Kunapareddy Chiranjeevi, Hyderabad (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/268,152

(22) Filed: Sep. 16, 2016

(65) Prior Publication Data

US 2017/0068995 A1    Mar. 9, 2017

Related U.S. Application Data

(63) Continuation of application No. 14/129,344, filed as application No. PCT/US2011/066537 on Dec. 21, 2011, now abandoned.

(30) Foreign Application Priority Data

Sep. 13, 2011 (IN) .............................. 2646DEL2011

(51) Int. Cl.
    *G06Q 30/02* (2012.01)
    *G06N 20/00* (2019.01)

(52) U.S. Cl.
    CPC ......... *G06Q 30/0269* (2013.01); *G06N 20/00* (2019.01); *G06Q 30/02* (2013.01); *G06Q 30/0277* (2013.01)

(58) Field of Classification Search
    CPC .......... G06Q 30/0269; G06Q 30/0251; G06Q 30/02; G06Q 30/0277; G06N 20/00
    (Continued)

(56) References Cited

U.S. PATENT DOCUMENTS

| 7,921,036 | B1 * | 4/2011 | Sharma | ................. G06Q 30/02 705/14.66 |
| 7,949,565 | B1 * | 5/2011 | Eldering | .............. H04N 21/466 705/14.49 |

(Continued)

FOREIGN PATENT DOCUMENTS

| CN | 1265757 A | 9/2000 |
| CN | 2927559 Y | 7/2007 |

(Continued)

OTHER PUBLICATIONS

Supplementary European Search Report, EP11872262, dated Jan. 9, 2015, 7 Pgs.

(Continued)

*Primary Examiner* — Azam A Ansari
*Assistant Examiner* — Robert C Johnson
(74) *Attorney, Agent, or Firm* — Schwegman Lundberg & Woessner, P.A.

(57) ABSTRACT

A digital advertising system includes an advertisements module that provides a number of digital advertisements for display on a digital display device. A digital sign module including the digital display device displays digital advertisements provided by the advertisements module, and captures video analytics data relating to previous viewers of the digital advertisements displayed by the digital sign module. A data mining module retrieves the video analytics data from the digital sign module and generates trained advertising models based thereon using a data mining algorithm. A content management system module coupled to the adver- (Continued)

tisements module and the data mining module receives the digital advertisements and the trained advertising models and generates a subset of the advertisements for display based on the trained advertising models.

20 Claims, 8 Drawing Sheets

(58) Field of Classification Search
USPC .................................................. 705/14.72
See application file for complete search history.

(56) References Cited

U.S. PATENT DOCUMENTS

| | | |
|---|---|---|
| 2002/0072952 A1 | 6/2002 | Hamzy et al. |
| 2006/0282319 A1* | 12/2006 | Maggio .............. G06Q 30/0217 705/14.19 |
| 2006/0282533 A1* | 12/2006 | Steelberg ........... G06Q 30/0269 709/224 |
| 2007/0220034 A1* | 9/2007 | Iyer ..................... G06F 16/2465 |
| 2008/0009277 A1 | 1/2008 | Bidwell |
| 2008/0117202 A1* | 5/2008 | Martinez ............... G06F 16/437 345/418 |
| 2008/0306804 A1 | 12/2008 | Opdycke et al. |
| 2009/0192874 A1 | 7/2009 | Powles et al. |
| 2009/0197616 A1* | 8/2009 | Lewis .................. H04M 3/4878 455/456.1 |
| 2009/0217315 A1* | 8/2009 | Malik .................... H04N 7/181 725/9 |
| 2009/0234717 A1 | 9/2009 | Wiggings et al. |
| 2010/0116650 A1 | 5/2010 | Bostock |
| 2010/0125500 A1 | 5/2010 | Beavers et al. |
| 2011/0035282 A1 | 1/2011 | Spatscheck et al. |
| 2011/0032163 A1 | 2/2011 | Katada et al. |
| 2011/0097262 A1 | 4/2011 | Goetsch et al. |
| 2011/0106631 A1* | 5/2011 | Lieberman ............. G06Q 30/02 705/14.72 |
| 2014/0122248 A1 | 5/2014 | Kuzama et al. |
| 2015/0134460 A1* | 5/2015 | Tian ................... G06Q 30/0269 705/14.66 |
| 2017/0068995 A1* | 3/2017 | Kuzma .............. G06Q 30/0277 |

FOREIGN PATENT DOCUMENTS

| | | |
|---|---|---|
| CN | 101454793 A | 6/2009 |
| CN | 101459806 A | 6/2009 |
| CN | 103765457 | 4/2014 |
| EP | 2756474 | 7/2014 |
| JP | H10-048008 | 9/1999 |
| JP | 2006-254274 | 9/2006 |
| JP | 2007-535720 | 12/2007 |
| JP | 2010-020666 | 1/2010 |
| KR | 10-2006-0080243 | 7/2006 |
| KR | 10-2008-0009277 | 1/2008 |
| KR | 10-2010-0116650 | 11/2010 |
| KR | 10-2011-0032163 | 3/2011 |
| KR | 10-2011-0097262 | 8/2011 |
| KR | 20140056333 | 5/2014 |
| KR | 101616652 | 4/2016 |
| KR | 20160052759 | 5/2016 |
| KR | 101756218 | 7/2017 |
| WO | 2013039542 | 3/2013 |

OTHER PUBLICATIONS

Preliminary Rejection, KR Application No. 10-2014-7006406, 4 pages, dated Aug. 21, 2015.
PCT Search Report, PCT/US2011/066537, dated Sep. 28, 2012, 2 pages.
Japanese Application No. 2014-529700 "Organized Translation of Decision of Rejection", dated Feb. 16, 2016, 2 pages.
Japanese Application No. 2014-529700 "Organized Translation of Notice of Reasons for Rejection", dated Jul. 7, 2016, 2 pages.
Japanese Application No. 2014-529700 "Organized Translation of Examiners Report to the Board", dated Sep. 30, 2016, 2 pages.
"Development of Delivery Management Technology for Enhancing Worth as a Media of a Digital Sign", Business Communication, Jul. 1, 2008, vol. 45, No. 7, pp. 6-7.
International Preliminary Report on Patentability received for PCT Patent Application No. PCT/US2011/066537, dated Mar. 27, 2014, 7 pages.
The First Office Action of copending Chinese application 201180073425.X dated Mar. 3, 2016, 34 pages.
The Second Office Action of copending Chinese application 201180073425.X dated Oct. 9, 2016, 46 pages.
The Third Office Action of copending Chinese application 201180073425.X dated Dec. 18, 2016, 26 pages.
The Fourth Office Action of copending Chinese application 201180073425.X dated Jun. 7, 2018, 26 pages.
Chinese Application No. 201180073425.X, "Decision on Rejection," dated Oct. 24, 2018, 25 pages.
European Application No. 11872262.8, "Communication pursuant to Article 93(3) EPC," dated Dec. 22, 2017, 6 pages.
Chinese Office Action for Application No. 201180073425.X (PCT/US2011/066537), dated Aug. 26, 2019, 12 pages.
Chinese Reexamination Notice for Application No. 201180073425.X, dated Aug. 26, 2019, 33 pages.
Chinese Office Action for Application No. 201180073425.X dated Jan. 7, 2020, 18 pages.
Indian Examination Report for Application No. 2646/DEL/2011, dated Jul. 31, 2019, 5 pages.
"International Application Serial No. PCT US2011 066537, Written Opinion dated Sep. 28, 2012", 5 pgs.
"European Application Serial No. 11872262.8, Response filed Jul. 2, 2018 to Communication Pursuant to Article 94(3) EPC dated Dec. 22, 2017", 10 pgs.
"European Application Serial No. 11872262.8, Response filed Aug. 6, 2015 to Extended European Search Report dated Jan. 9, 2015", 12 pgs.
"European Application Serial No. 11872262.8, Noting of loss of Rights mailed Jul. 29, 2019", 1 pg.
"Indian Application Serial No. 2646 DEL 2011, Response filed Jan. 31, 2020 to Examination Report dated Jul. 31, 2019", 25 pgs.
"Chinese Application Serial No. 201180073425.X, Response filed Jul. 18, 2016 to Office Action dated Mar. 3, 2016", w o English Translation, 3 pgs.
"Chinese Application Serial No. 201180073425.X, Response filed Jan. 24, 2017 to Office Action dated Oct. 9, 2016", w o English Translation, 2 pgs.
"Chinese Application Serial No. 201180073425.X, Response filed Aug. 21, 2018 to Office Action dated Jun. 7, 2018", w o English translations, 2 pgs.
"Chinese Application Serial No. 201180073425.X, Response filed Sep. 25, 2019 to Office Action dated Aug. 26, 2019", w o English translation, 2 pgs.
"Chinese Application Serial No. 201180073425.X, Response filed Apr. 2, 2018 to Office Action dated Dec. 18, 2017", w o English Translation, 13 pgs.
"Chinese Application Serial No. 201180073425.X, Decision of Rejection dated Mar. 6, 2017", w English Translation, 61 pgs.
"U.S. Appl. No. 14/129,344, Preliminary Amendment filed Dec. 26, 2013", 9 pgs.
"U.S. Appl. No. 14/129,344, Non Final Office Action dated Sep. 28, 2015", 19 pgs.
"U.S. Appl. No. 14/129,344, Response filed Dec. 28, 2015 to Non Final Office Action dated Sep. 28, 2015", 11 pgs.
"U.S. Appl. No. 14/129,344, Final Office Action dated Mar. 16, 2016", 24 pgs.
"U.S. Appl. No. 14/129,344, Response filed May 16, 2016 to Final Office Action dated Mar. 16, 2016", 15 pgs.
"U.S. Appl. No. 14/129,344, Advisory Action dated Jun. 17, 2016", 4 pgs.
"U.S. Appl. No. 14/129,344, Examiner Interview Summary dated Jul. 6, 2016", 3 pgs.
"Korean Application Serial No. 10-2014-7006406, Notice of Preliminary Rejection dated Jul. 22, 2015", 9 pgs.

(56) References Cited

OTHER PUBLICATIONS

"Korean Application Serial No. 10-2014-7006406, Response filed Sep. 22, 2020 to Notice of Preliminary Rejection dated Jul. 22, 2015", 10 pgs.

"Korean Application Serial No. 10-2016-7010563, Notice of Preliminary Rejection dated Jul. 1, 2016", 11 pgs.

"Korean Application Serial No. 10-2016-7010563, Response filed Oct. 4, 2016 to Notice of Preliminary Rejection dated Jul. 1, 2016", 25 pgs.

Minyu, Shi, "Research on Personalized Web Advertising Recommendation System Based on RSS", Chinese Doctoral Dissertations Full-Text Database—Collections of Economics and Management Science monthly) No. 5, (May 15, 2009), J155-1.

Na, Li, "Research on Precision Advertising System Based on Incremental Learning", Chinese Master's Theses Full-Text Database—Collections of Information Technology (monthly) No. 4, (Apr. 15, 2011), I138-713.

* cited by examiner

DIGITAL ADVERTISING SYSTEM

CROSS-REFERENCE TO RELATED APPLICATIONS:

This application is a continuation application of U.S. application Ser. No. 14/129,344, entitled "Digital Advertising System", by Andrew Kuzma, et al., filed Dec. 26, 2013, which is a U.S. National Phase Application under 35 U.S.C. 371 of International Application No. PCT/US2011/066537, entitled "Digital Advertising System", by Andrew Kuzma, et al., filed Dec. 21, 2011, which claims priority to Indian Patent Application No. 2646/DEL/2011, filed Sep. 13, 2011, entitled "Intelligent Advertising Framework System", the benefit of and priority to which are claimed thereof and the entire contents of which are incorporated herein by reference.

FIELD OF THE INVENTION

Embodiments of the invention relate to a system for selecting advertising to be displayed on a digital display device based on video analytics.

BACKGROUND OF THE INVENTION

Digital signage is the term that is often used to describe the use of an electronic display device, such as a Liquid Crystal Display (LCD), Light Emitting Diode (LED) display, plasma display, or a projected display to show news, advertisements, local announcements, and other multimedia content in public venues such as restaurants or shopping malls. In recent years, the digital signage industry has experienced tremendous growth, and it is now only second to the Internet advertising industry in terms of annual revenue growth.

The deployment of digital signs is growing rapidly for good reason. They enable advertisers to show advertising (ad) content that is more engaging and dynamic and to easily change the content in real time based on new promotions, time of day, even weather and other events. Currently there is no way to determine the effectiveness of the ad content. One of the main challenges in the digital signage industry has been providing digital signage operators with some clear return on investment (ROI) data. What is needed is a way for ad content to be targeted and adapted to the specific demographics of the people viewing it.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Anonymous Video Analytics (AVA) is a passive and automated audience or viewer measurement technology designed for digital signage networks that can be used to provide digital signage operators with quantitative viewership information and return on investment (ROI) data. Embodiments of the present invention are based on the concept of using AVA data and data mining techniques to achieve targeted advertising, which can he used to measure and improve the advertising ROI of a digital sign. Additionally, by correlating AVA viewership information with point-of-sale (POS) data, embodiments can also be used to establish a link between the response time to an advertisement by a certain demographic group and the effect on the sale of the advertised product.

Embodiments of the present invention make use of anonymous video analytics (AVA) in displaying advertising on a digital display device. By equipping digital signs with a sensor, such as one or more front-facing cameras proximate the digital display device, and AVA software coupled with powerful processors, such as Intel Core 15 and Intel Core 17 processors, digital signs according to an embodiment of the invention have the intelligence to anonymously detect the number of viewers, their gender, their age bracket, even their distance from the advertising display screen and then adapt ad content based on that information. For example, if a viewer is a teenage girl, then an embodiment of the invention may change the content to highlight a back to school shoe promotion a few stores down from where the digital display screen is located. If the viewer is a senior male, then an embodiment may cause the digital display screen to display an advertisement about a golf club sale at a nearby sporting goods store.

According to an embodiment of the invention, ads can be better targeted, more relevant, and ultimately more effective. The embodiment makes this possible by analyzing perhaps millions of pixels per second of video content in real time to determine if people are viewing the digital sign, and if they are, determining their demographic characteristics. These intelligent digital signs can do even more, according to embodiments of the invention. For example, they can determine dwell time, that is, how long viewers are watching the ads. These capabilities enable network operators, content providers, advertising agencies, and service providers to better deliver relevant messages and measure network and ad effectiveness with greater precision. By correlating sales data with the ad shown and the audiences' demographics, advertisers can target ads directly to their audience and measure their effectiveness. Additionally, for campaign planning and return-on-investment (ROI) measurement, AVA data can be correlated with "proof-of-play" data, that is data relating to what, where, and when an ad was displayed on the digital sign, to determine content-specific viewership metrics by demographics and time of day.

Embodiments of the invention are based on the concept of targeted advertising in which future viewers or customers belonging to the same or similar demographic as previous viewers are targeted based on the viewing behavior or patterns of the previous viewers. By analyzing AVA or viewership data collected from previous viewers positioned in front of a digital display, embodiments can discover viewing patterns and use this information to train advertising models that can be deployed to the digital sign. These advertising models can then be used to choose specific advertisements from the inventory of available advertising content to intelligently target future viewers.

The advertising models are based on data mining principles and can be built using tools such as Microsoft's SQL Server Analysis System (MS SSAS). The advertising models are created using well-known data mining algorithms such as Naïve Bayes, Decision Trees, and Association Rules, along with large scale clustering, all of which are available in MS SSAS.

The playback of multimedia content on a digital sign is accomplished through a content management system (CMS). A description follows of the architecture of the digital advertising system in accordance with an embodiment of the invention, in which advertising models are deployed in real time on the digital sign through the CMS, even if the CMS is located "in the cloud". The CMS can then be used to generate a customized advertising list based on at least two parameters, the trained advertising model, and advertising data. According to an embodiment of the invention, the advertising data is combined with the trained advertising model to enable real-time content triggering.

Embodiments of the invention analyze the type of viewer information, such as age, in particular, an age range or age bracket, and gender, as well as weather and time information to select the most appropriate advertisement to be played on the digital sign display device. Further references herein to "age" shall be understood to include an age range, category or bracket. Real time video analytics data is collected and analyzed to predict the type of viewers for a future time slot, for example, the next time slot. Depending on the prediction, appropriate ads are played on the display device. The CMS generates a default play list by using advertising information and advertiser preference. If viewership information is not available or the prediction is for some reason not made or not reasonably accurate or for some reason the accuracy of the prediction is considered suspect, then an offline (default) play list provided to CMS by the advertisers may be played on the display device.

Figure 1:
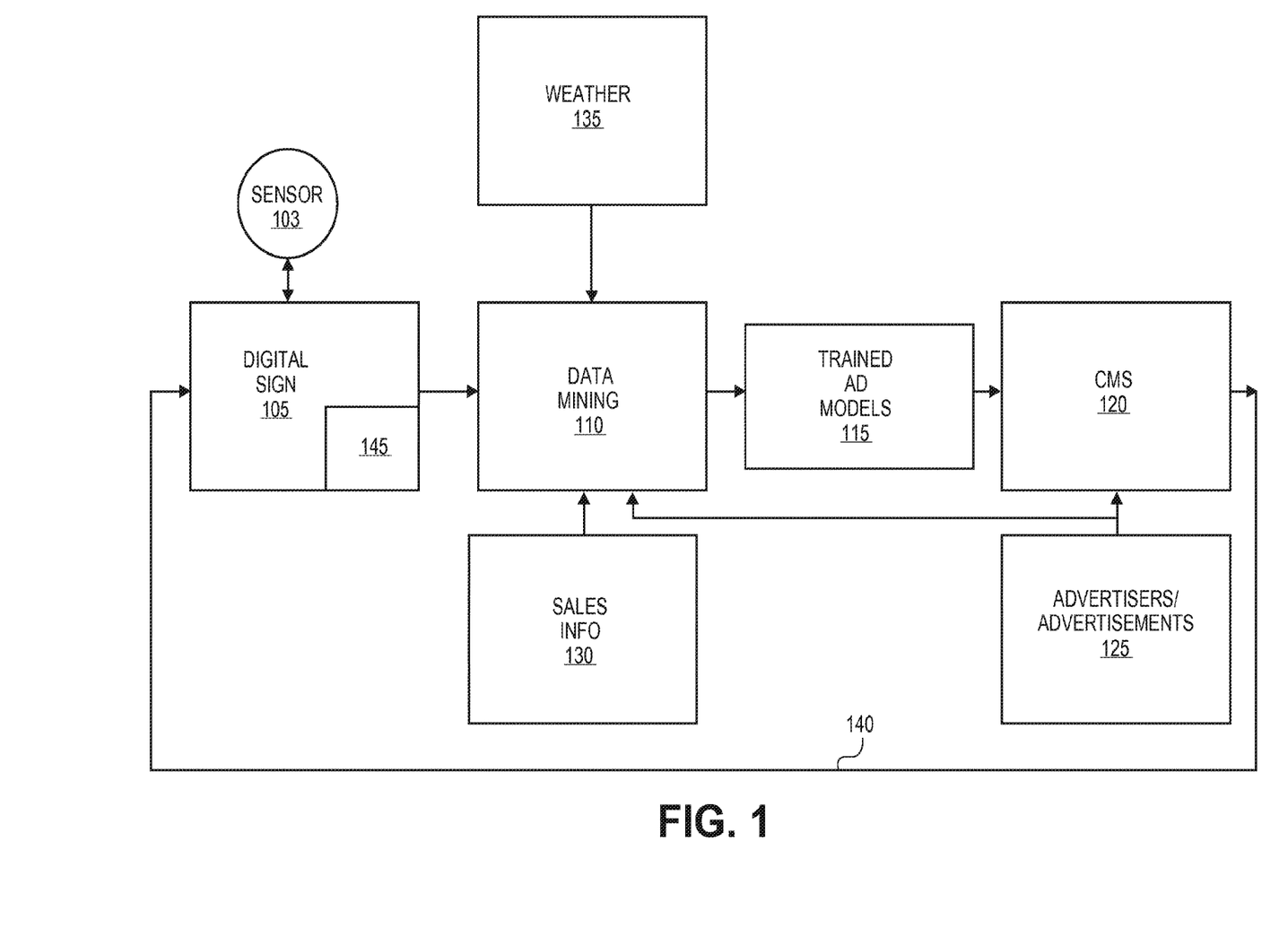
FIG. 1 illustrates in functional block form an embodiment of the invention.

FIG. 1 illustrates a functional block diagram of an embodiment of the invention. With reference also to the flow chart 200 in FIG. 2, the process starts at 205 with digital sign module 105 displaying advertisements, processing video analytic data at 210, that is, capturing video analytic data, also referred to herein as viewership data, and sending the viewership data to a permanent data store, such as a database, where the data is optionally cleaned or filtered before being accessed at 215 by the data mining module 110 to determine viewing patterns of any individuals located in front of the digital sign and capable of viewing the same.

Figure 2:
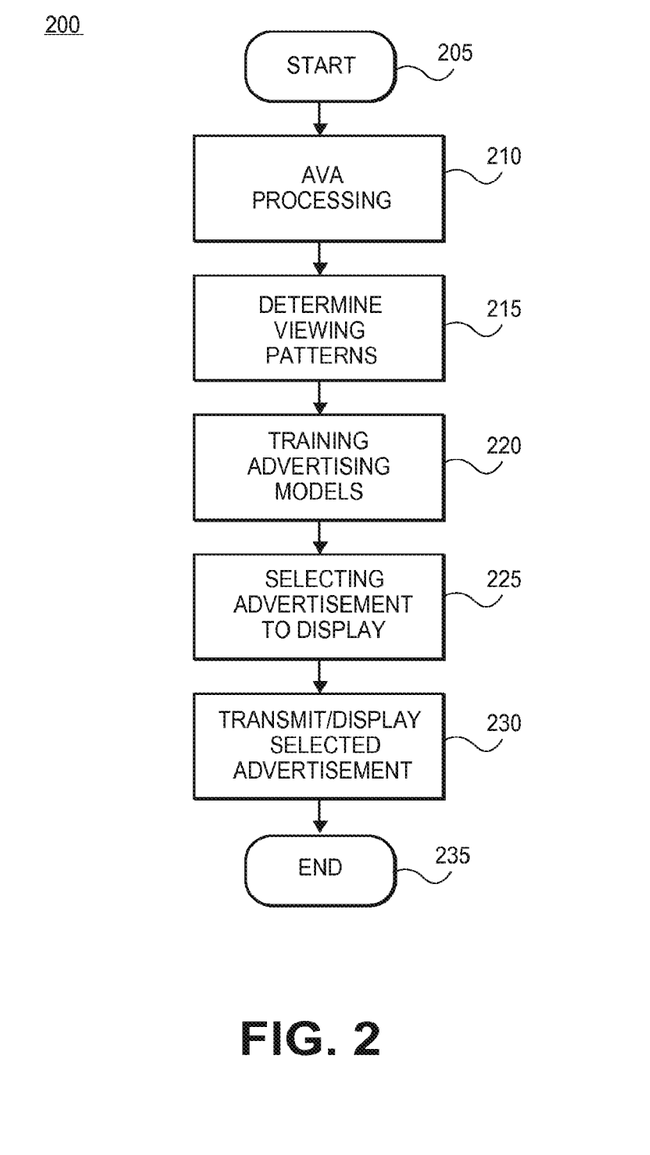
FIG. 2 is a flow chart of an embodiment of the invention.

Importantly, at least for the purpose of maintaining privacy, the video analytic data can be made or maintained as anonymous video analytic data, as will be described further below, but essentially, the viewership data is based on census (defined as systematically and regularly acquiring and recording information about members of a given population), not on sampling, and no images of viewers are captured, stored, or transmitted. The video analytic data capture functionality may be embodied in software executed by the digital sign module, and in one embodiment of the invention, captures real time video analytic data that may be used by module 110 to make real time predictions and schedule a digital advertisement for display, and/or may be used as historical data for generating rules (training advertising models) in the data mining module at 220.

In the data mining module, the advertising models are generated and trained (that is, refined) at 220 using the video analytic data based on well-known data mining algorithms such as the Naïve Bayes algorithm, the Decision Trees algorithm and the Association Rules algorithm used in determining viewing patterns at 215. In addition to using the video analytic data, the data mining module may also consider weather conditions corresponding at the time the video analytic data was captured. Weather conditions data, or simply, weather data 135, may be maintained in a permanent store that can be accessed by data mining module 110. In one embodiment, the same permanent store may be used to store the video analytic data captured by the digital sign module 105 as well. Further, data mining module 110 receives as input a list of digital advertisements 125 available for display on the digital sign, and metadata associated the of advertisements, such as the demographic characteristics of viewers to which advertisers wish to target their advertisements. Digital sign module 105 also supplies to the data mining module "proof-of-play" data, that is, advertising data indicating what ads were displayed by the digital sign, when those ads where displayed, and where those ads were displayed (e.g., by providing a deviceID for the digital sign that can be used as a basis for determining the location of the digital sign). In one embodiment of the invention, sales data 130, for example, from a Point-of-Sale terminal, may be input to data mining module 110. The sales data may be correlated with the AVA data to gauge the effectiveness of an advertisement on a certain demographic group in terms of the sale of products or services featured in the advertisement.

The data mining module 110 generates at 220 trained advertising models which according to an embodiment of the invention are used to predict suitable advertising categories as well as future viewer types based on previous viewer types ("passer pattern types"). Once a trained advertising model 115 is generated it is transmitted by the data mining module and received and stored by the content management system (CMS) 120 where along with advertising data, a customized advertising list is generated and stored at 225. (Indeed, the CMS stores all trained advertising models, advertisement lists, advertiser preferences, and advertising data.) CMS 120 transmits the customized advertising list at 140 to digital sign 105 for display. In one embodiment of the invention, digital sign module 105 comprises a digital signage media player module (digital player module) 145, which may be used to generate the advertising lists in real time. Module 145 operates as a condensed repository for information stored in the CMS.

The CMS obtains trained advertising models from the data mining module. In one embodiment, multiple digital sign modules 105, or multiple digital signage media players 145, or multiple digital display devices are installed. The CMS therefore will segregate the advertising models by digital sign module, or digital player, etc., as the case may be. The CMS generates segregated customized ad lists based on the advertising models and obtained advertising data. The CMS also generates offline ad lists, that is, default ad lists, based on advertiser preferences obtained from advertisers 125. These segregated models, customized ad lists, and default ad lists are sent to each digital sign module or digital player at 230 for display on the digital sign.

While FIG. 1 illustrates modules 110 and 120 as separate functional blocks, it is appreciated that these modules may co-operate on a single computer system, or may be distributed across multiple computer systems. The computer system(s) may reside in a private communications network, or may be accessible over the Internet "in the cloud". The digital sign functional block, including AVA software and the digital signage media player 145 is typically implemented in or connected to one or more servers coupled to one or more digital display devices located in an area where advertisers desire to display digital advertisements on a digital sign, such as a retail store or shopping mall. One or more sensors such as sensor 103, for example, an optical device such as a video camera, are coupled, to the digital sign 105 to capture the video or images of viewers used by digital sign 105 to generate the AVA data.

Capturing Viewers

Proof-of-Impression (POI) is a metric by which an advertiser measures effectiveness of a digital advertisement. Essentially, POI indicates whether individuals near a digital sign viewed or glanced or did not glance at the digital sign. In one embodiment of the invention, to obtain this metric, a number of events occur: 1) a glance is taken at the digital sign by a viewer while in an area from which the digital advertisement can reasonably be observed, 2) the observer, which in one embodiment is a video camera, is in a position to observe a glance, even a short glance, from a viewer, and 3) once a viewer has glanced at the digital advertisement, additional glances need not be counted while the viewer remains in the observable area. Measuring POI also involves differentiating, and uniquely tracking different, individual viewers while they are within the observable area, and associating each uniquely tracked individual viewer with a state variable relating to looking at the digital advertisement. Thus, a digital sign measuring POI monitors a viewer at locations from which the viewer can glance at the digital sign.

Beyond this basic functionality discussed above for measuring POI, an embodiment of the invention may measure viewing time, or glance duration, relate a particular glance to a particular rendition or display of a digital advertisement on the digital sign, determine locations and time when the digital sign gets a number of glances, such as a minimum number or a maximum number of glances. Further, demographic information may also be gathered according to one embodiment, such as age, gender, ethnicity, weight, etc., allowing the embodiment to further refine the business intelligence derived from measuring POI. In another embodiment, this metric can be correlated with sales data for products or services offered for sale in the digital advertisements to assess the effectiveness of the advertisements.

Embodiments may range from a single digital sign with one video camera to multiple digital signs each with one or more cameras. In any case, the video camera is used to track a viewer using sampling rates of, for example, 5-30 frames per second, and the viewer is assigned a unique, anonymous identity, while the camera looks for glance activity. The unique anonymous identity allows recording of glance activity for each individual viewer while in the observing area in front of a digital sign.

Figure 6A:
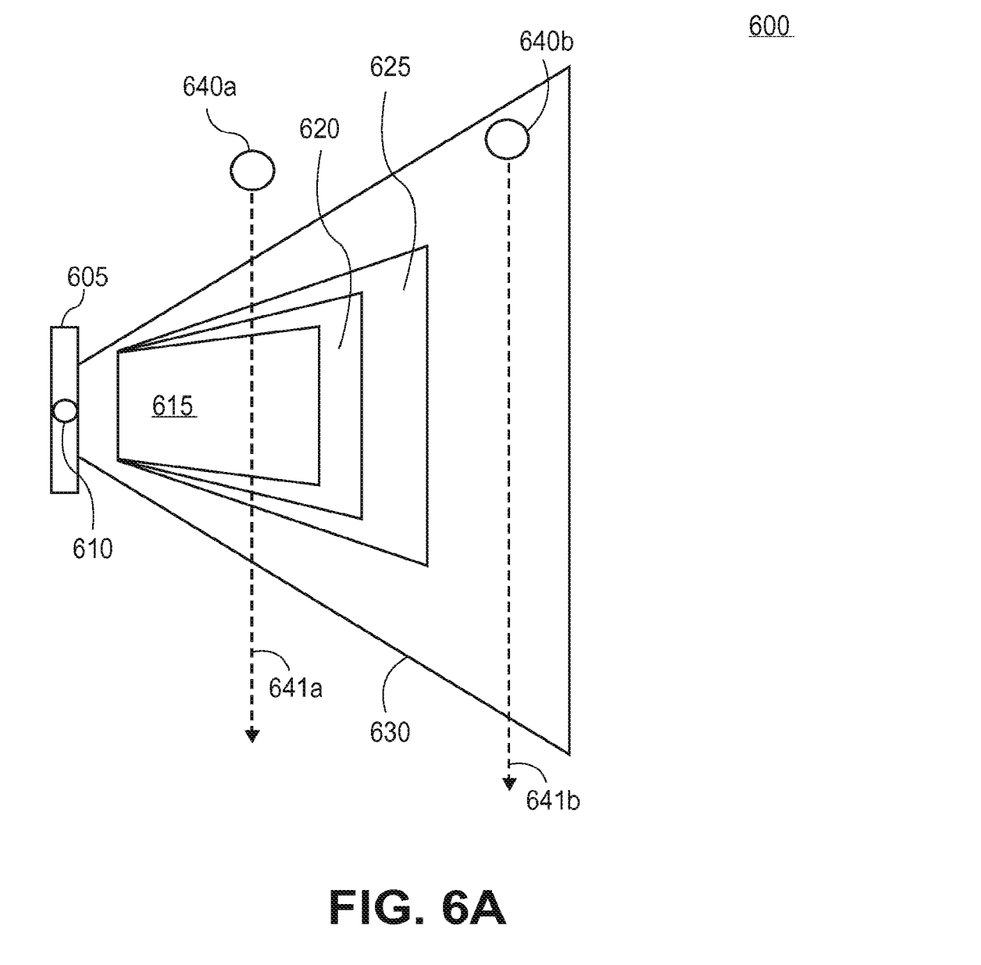
FIG. 6A illustrates an aspect of an embodiment of the invention relating to obtaining video analytic data relating to individual viewers within an observable area of a digital sign.

The ability of an embodiment to capture and track glances for each individual in the viewing area is based on the quality of the optical capture device, whether a video camera or digital camera, the sophistication of back-end computer vision and video and/or image processing functionality, and on the distance the individual is located from the video camera. With reference to FIG. 6A, an environment 600 is depicted in which a digital display screen 610 capable of displaying a digital sign in accordance with an embodiment of the invention is located. A front-facing video camera 610 (shown in top down view) is located near the digital display screen, for example, mounted on top of the screen. An overall viewing area is illustrated by the perimeter defined by line 630. Individuals 640a and 640b pass through this viewing area in the direction of travel indicated by respective dashed lines 641a and 641b. The video camera and associated back-end processing is capable of capturing video or still images and detecting unique individuals within an observable area 625. Thus, individual 640a is capable of being observed and isolated by video camera 610, while individual 640b is not. For video camera 610 to actually detect a gaze or glance by individual 640a in the direction of digital display screen 605, individual 640a must pass through or within a glance notice area 620. And for camera 610 to detect the length of time individual 640a glances at the digital display screen, that is, the glance dwell time, individual 640a must be inside area 615. Thus, the ability of video camera and associated back-end processing functionality to capture and isolate a unique viewer impacts the ability of digital sign module to gather video analytic data on a per viewer basis.

Figure 6B:
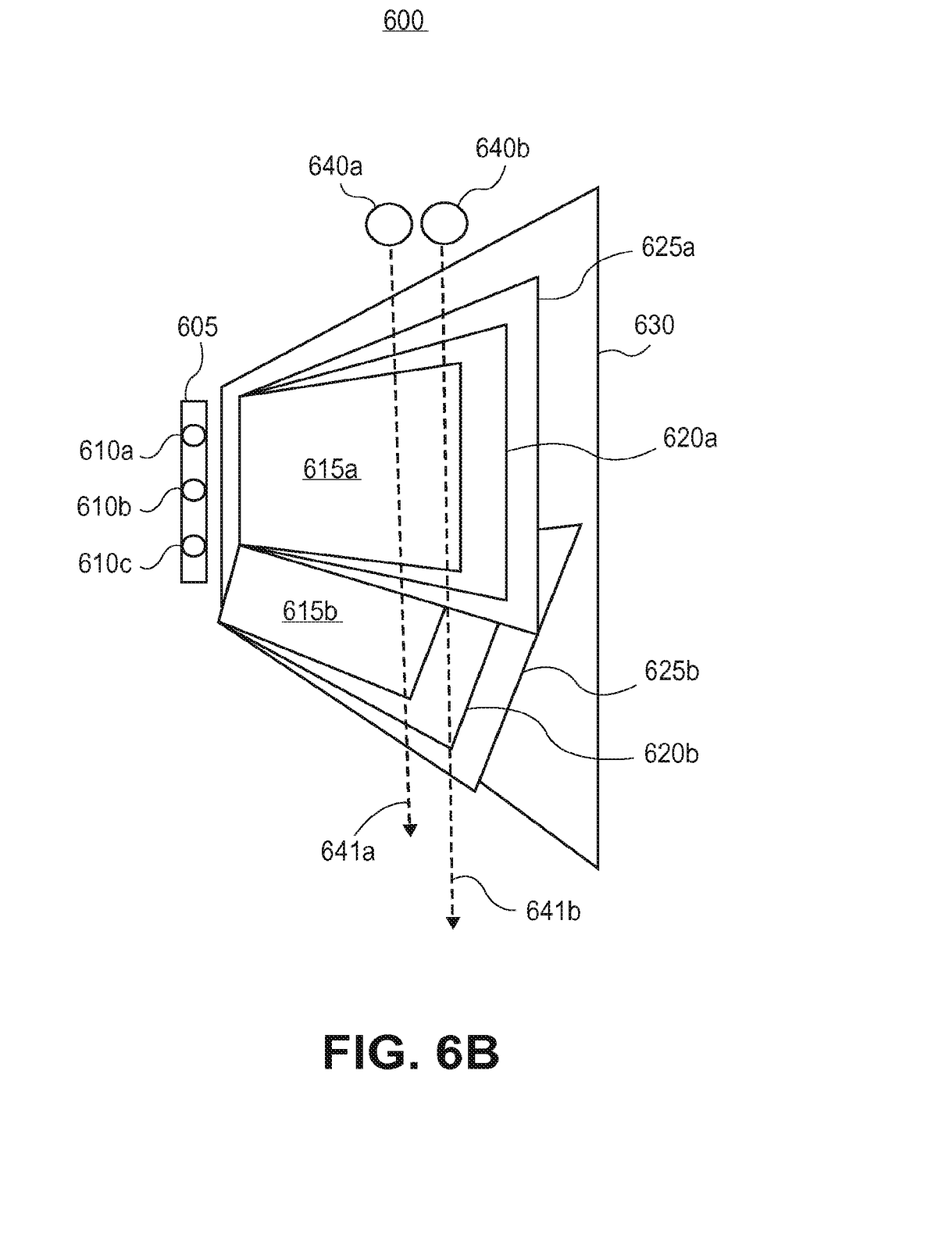
FIG. 6B illustrates an aspect of an embodiment of the invention relating to obtaining video analytic data relating to individual viewers within an observable area of a digital sign.

In one embodiment, the ability to track a viewer over a larger area is accomplished by employing multiple observers, that is, multiple cameras. FIG. 6B illustrates an environment 600 in which a digital display screen 610 is located. In this embodiment, three front-facing video cameras 610a, 610b, and 610c are mounted on top of the screen. An overall viewing area is illustrated by the perimeter defined by line 630. Individuals 640a and 640b pass through this viewing area in the direction of travel indicated by respective dashed lines 641a and 641b. However, the video cameras and associated back-end processing are capable of capturing video and detecting unique individuals only within observable area 625. Since there are multiple video cameras, and because of the different locations in which the video cameras 610a, 610b and 610c are placed, and the different directions in which the video cameras are pointed, a larger viewing area is established compared to the embodiment illustrated in FIG. 6A. Since camera observing areas are adjacent and perhaps even overlap, it is feasible to track a viewer over a greater area/over a longer period of time. Thus, both individual 640a and 640b are capable of being observed and isolated by the video cameras. The video cameras are also able to detect a gaze or glance by both individuals since they both pass through or within a glance notice area 620a and 620b. And the cameras are able to detect the length of time individual 640a glances at the digital display screen, that is, the glance dwell time while tracking individual 640a inside areas 615a and 615b. However, since individual 640b passes through area 615a but not 615b, the ability of the cameras to determine glance dwell time is limited to while individual 640b is only within area 615a.

It is contemplated that multiple digital signs, or multiple digital display screens, may be co-located, for example, in a department store or shopping mall that may be concurrently running distinct or different advertising campaigns. The different departments can deploy the multiple digital signs in adjacent or nearby digital sign zones. The signs and digital advertisements displayed thereon may be hosted by the same or different companies or advertisers, and each zone may want to derive distinct anonymous video analytics for their customers, or distinct data per advertisement per zone. It is also contemplated according to an embodiment of the invention that advertisements may cross multiple zones, for example, in order to measure effectiveness of storewide advertising, such as store branding, special offers, etc.

It is appreciated that the video cameras and back-end video processing functionality collect sufficient information that individuals may be personally identifiable, raising privacy concerns depending on the country, state, or context. An embodiment of the invention assigns an anonymous tag to each unique individual viewer while the viewer is within an observable area. The tag, then, rather than the individual, is associated with glance activity and demographic data, etc. When the viewer leaves an observable area, the tag may be kept active for a while in case the viewer re-enters the observable area and can be reliably identified as the same viewer. Within a reasonably short time, however, the tag is recycled and made available to use to track another individual who enters the observable area.

In one embodiment, face detection functionality is implemented in algorithms embodied in software executed in conjunction with age and gender classification algorithms also embodied in software. In one embodiment, the Viola-Jones object detection framework developed by Paul Viola and. Michael Jones in 2001 is used for facial recognition. The features employed by the detection framework involve the sums of image pixels within rectangular areas. The Haar Classifier algorithm is used for age and gender classification in one embodiment of the invention. Software embodying these algorithms is executed in conjunction with software that gathers demographic information, as well as computer vision software, by computer processors, such as Intel Core 15 and Intel Core 17 processors and associated hardware.

In one embodiment, the computer vision software is based on the OpenCV. OpenCV is an open source computer vision library developed by Intel Corporation, the assignee of the present invention, and is free for commercial and research use under a Berkeley Software Distribution (BSD) license. The library is cross-platform, and runs on Apple's Mac OS X, as well as Microsoft's Windows operating system, and Linux-based operating systems. It focuses mainly towards real-time image processing. Generally, the OpenCV library supports real-time capture, video file import, basic image treatment (brightness, contrast, threshold, etc.), and object detection (face, body, etc.).

Figure 7:
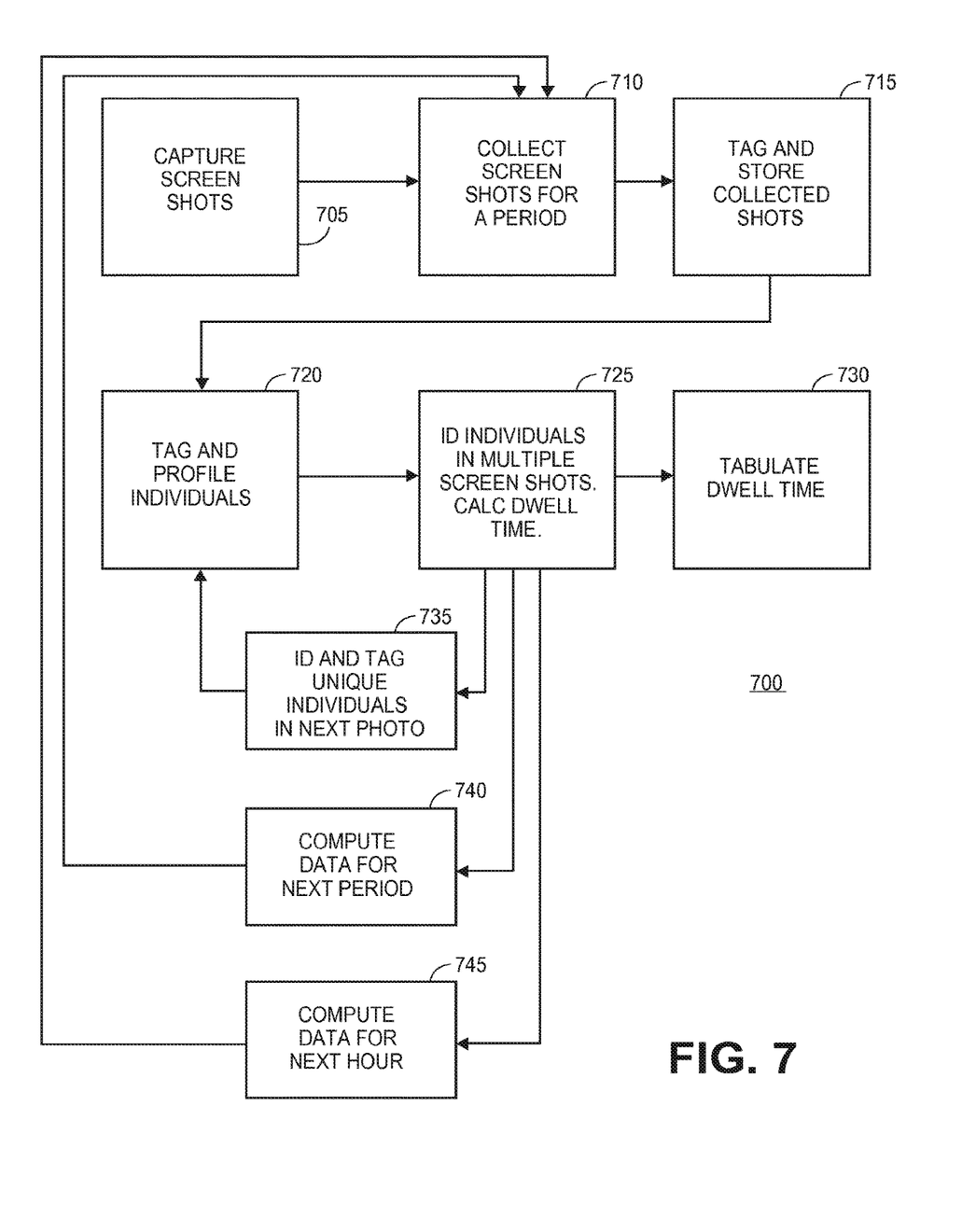
FIG. 7 is a flow chart of an embodiment of the invention relating to obtaining anonymous video analytic data relating to individual viewers within an observable area of a digital sign.

With reference to FIG. 7, an embodiment of the invention as it relates to capturing anonymous video analytic data is described. Flow chart 700 starts at 705 wherein screen shots of viewers are captured. One or more optical capture devices such as a still camera or a video camera are mounted on or near a digital sign and take screen shots (e.g, photos) at frequent intervals of time, say every 5 seconds. Thus, during one minute, 12 screen shots are captured. These digital images are collected for a particular period of time, say 1 minute, at 710. Each of the images in a particular collection is tagged with a unique tag and a number identifying each image is added to the unique tag, e.g., hour2-minute1-image1, hour2-minute1-image2 . . . hour2-minute1-image12, at 715. At 720, each individual in the first image, i.e., hour1-minute1-image1 is then identified. For example, the first individual identified may have a tag such as hour2-minute1-image1-individual-1 associated with him. The individual is then profiled for sex and age, and perhaps other personal characteristics. This same process is repeated for other individuals, if any, in the same photo, e.g., hour2-minute1-image1-individual-2, hour2-minute1-image1-individual-3, etc.

At 725, the individuals identified and tagged in the first photo at 720 are searched for and identified in the rest of the photos in the same collection, e.g., the remaining 11 images or photos in the hour2-minute1-image1 collection. For every photo in which the same individual is identified, a period of time is added to the dwell time parameter for that individual. For example, every time the same individual is recognized in one of 12 photos in the collection, 5 seconds is added to the dwell time parameter for that individual. At 735, each new individual, if any, that wasn't identified in the first photo of the collection but appears in the second photo is identified in the second. photo, and the process described above in 720 and 725 repeats for the second photo in the collection, and the process repeats again for any unidentified individuals in the remaining sequence of photos in the collection.

Once the tagging and computations are performed for a particular collection, at box 740 in the flow chart, the tagging and computations are performed for the next collection, e.g., the next one minute of photos, and at box 745, the tagging and computations are performed for the next one hour of photos. At 730, the dwell time based on particular parameters or personal characteristics, such as age and gender is tabulated for every collection (e.g., every minute) into a consolidated list.

Targeted Advertising

The point of targeted advertising is to show a future audience certain advertisements that have in the past been viewed for a reasonable amount of time by a previous audience having the same or similar demographics as the future audience. The process of targeted advertising according to an embodiment of the invention can be characterized in three phases and corresponding components of the digital advertising system according to an embodiment of the invention: training advertising models in the data mining module 110, creating customized ad lists, or playlists, in the CMS 120, and playing the playlists with a digital sign module 105.

Training Advertising Models

Data mining technology involves exploring large amounts of data to find hidden patterns and relationship between different variables in the dataset. These findings can be validated against a new dataset. A typical usage of data mining is to use the discovered pattern in the historical data to make a prediction regarding new data. In embodiments of the invention, the data mining module 110 is responsible for training and querying advertising models. In particular, two types of advertising models are generated, an advertising category (ad category) model, and a passer pattern model. In the ad category model, a set of rules is correlated with the most appropriate ad category for particular audience or context (e.g., time, location, weather). As an example (in which deviceID is an identifier associated with a particular digital sign and can be used to indicate the location of the digital sign):

If deviceID=561 and time=morning and day=Friday and gender=female and age=young and weather=clear and targeted ads=outdoor, then potential target=very strong (e.f., at 80% confidence)

If deviceID=561 and time=morning and day=Friday and weather=clear and targeted ads=Ad list 1, then potential target=likely (e.g., at 70% confidence)

In the above example, "Ad list 1" is a list from an ad category provided by an advertiser for a particular context, also stored in the CMS. In the passer pattern model, in which viewers pass by a digital sign, a set of rules assists in discovering audience behavior or predicting future audience based on previous audience. As an example:

If deviceID=561 and time=morning and day=Friday and weather=clear, then passer type=senior female (at 70% confidence)

If deviceID=561 and time=morning and day=Friday and IsWeekend=0 and weather=clear and WOPMaleSenior=0~1 and WOPFemaleSenior=0~1 and WOPMaleAdult=0~1 and WOPFemaleAdult=0~1 and WOPMaleYoungAdult=0~1 and WOPFemaleYoungAdult=0~1 and WOPMaleChild=0~1 and WOPFemaleChild=0~1 then WONMaleSenior=0~1 and WONFemaleSenior=0~1 and WONMaleAdult=0~1 and WONFemaleAdult=0~1 and WONMaleYoungAdult=0~1 and WONFemaleYoungAdult=0~1 and WONMaleChild=0~1 and WONFemaleChild=0~1.

Figure 3:
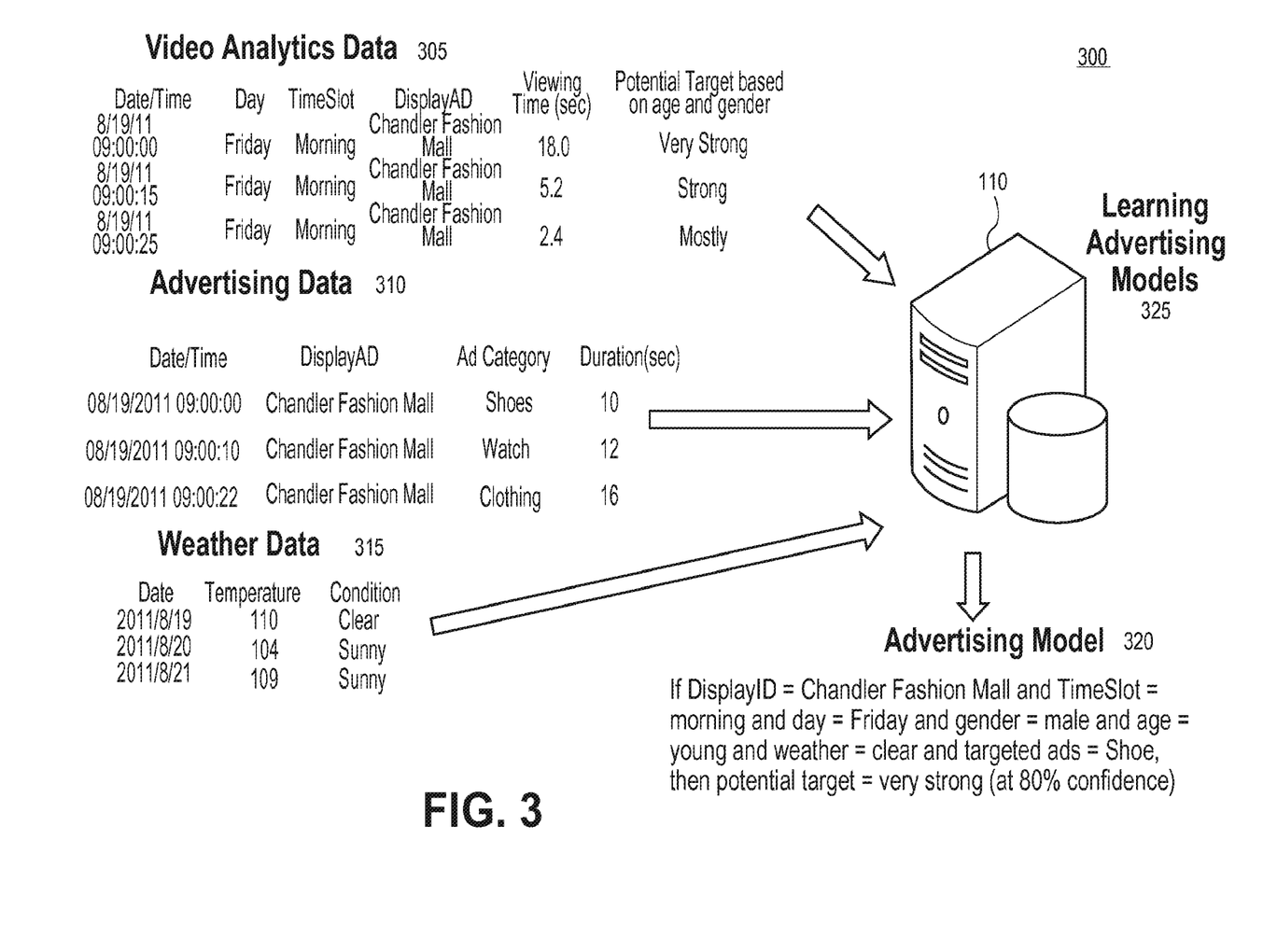
FIG. 3 illustrates aspects of an embodiment of the invention.

FIG. 3 provides an illustration 300 of the video analytic data 305 gathered by the digital sign module 105 and provided as input to the data mining module 110 along with advertising data 310, and weather data 315 also provided as input to the data mining module. At 325, the data mining module, in one embodiment, generates and trains, that is, refines, models on a regular basis, whether daily, weekly, monthly, or quarterly, depending on the context and data characteristics, the basic principle being that if the patterns/rules derived from historical data don't change, there is no need to train or regenerate models.

Video analytic data 305, according to one embodiment of the invention, comprises the date and time a particular digital advertisement was displayed on the digital sign, as well the day the ad was displayed, a deviceID or alternatively a displayID that indicates a location at which the ad was displayed. Sensor input also provides the amount of time that the digital ad was viewed while being displayed on the digital display device. Finally, an indication of the potential target viewership based on characteristics such as age and gender is included.

Advertising data 310, received by data mining module 110 from the advertisements repository 125, includes the date and time a particular digital advertisement was scheduled for display on the digital sign, as well a deviceID or alternatively a displayID that indicates a location at which the ad was scheduled to be displayed, and a duration or length of the digital advertisement, in seconds. Weather data 315 includes the date, temperature, and conditions on or around the date and time the digital advertising was displayed on the digital sign.

2. Creating Advertising List

After the advertising models are generated by data milling module 110, the models are transferred to the Content Management System (CMS) 120. The CMS then extracts the ad categories from the ad category models and creates an ad category list. The advertising data corresponding to these ad categories are then retrieved from a permanent store, such as a database, accessible to CMS 120. Based on the ad category list, CMS 120 also creates advertisement lists. In one embodiment of the invention, a generated ad list may be modified based on advertiser input at 125 in one embodiment, each advertiser is assigned a certain priority that can be used as a basis for rearranging the ad list.

Figure 4:
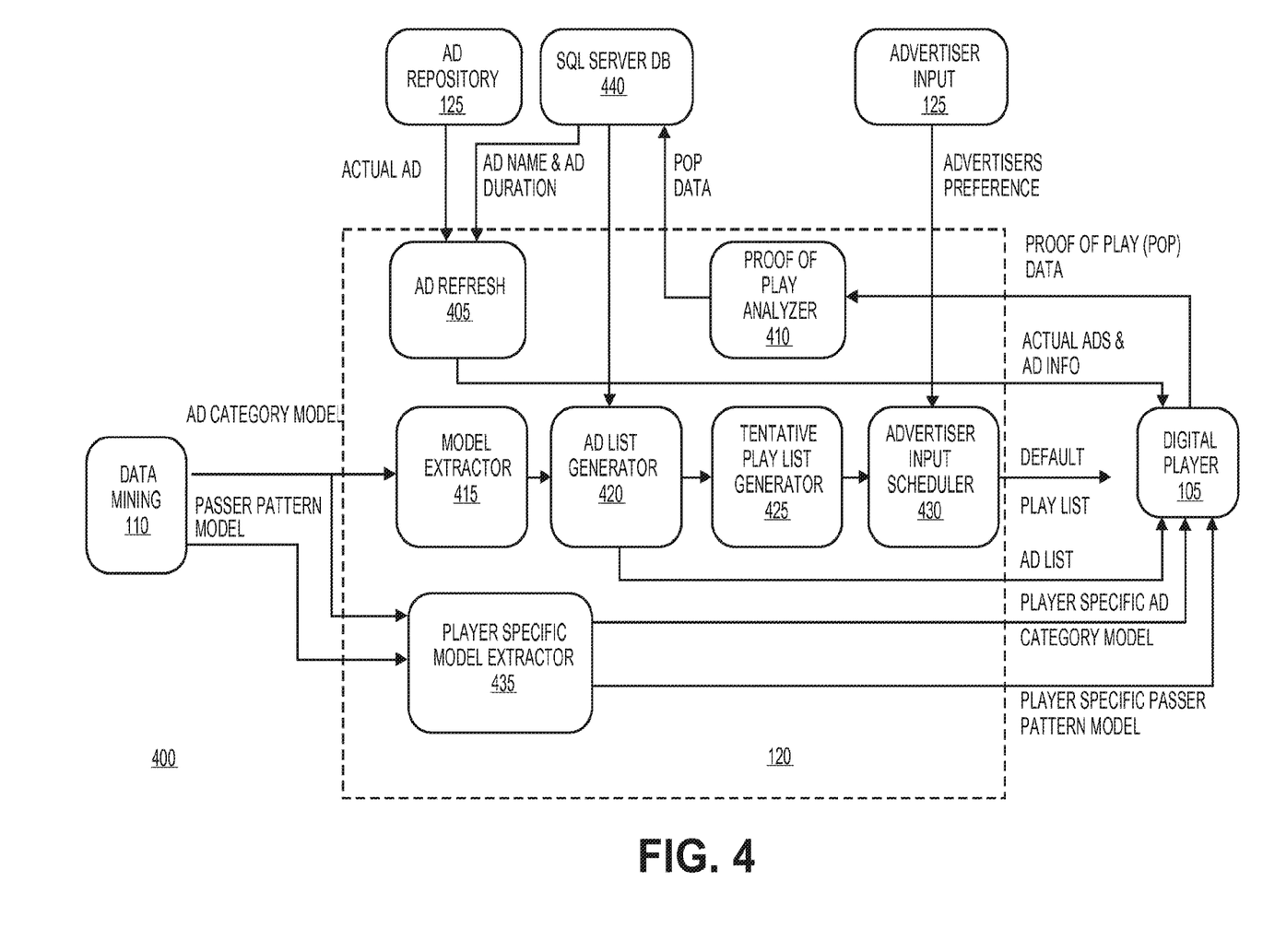
FIG. 4 provides a block diagram of a content management system in accordance with an embodiment of the invention.

FIG. 4 illustrates the flow of events and information 400 in the CMS 120. The CMS probes the data mining module 110. The frequency of probing in one embodiment of the invention is once a day. The CMS gets all the current rules and predictive lists generated by the data mining module and stores the information in a permanent store. Advertisements corresponding to particular categories are obtained from the tentative play list based on advertiser preferences, the ad list generator, and advertisement repository 125. In "offline mode" the tentative playlist is used as the default playlist. A data store, such as the Structured Query Language (SQL) server database depicted in FIG. 4, is associated with the advertisements repository 125, according to one embodiment. From that data store various information is retrieved including advertising data for the particular categories such as the advertising name, the advertising type, and a path in a file directory of the ad repository that holds the files for the actual advertisements. The CMS connects to the advertising repository to get the advertisements located at the given paths. All the models and the corresponding advertising lists generated so far get stored at the CMS. A digital sign module will only contain a subset of these models and advertising lists that are suitable for the digital sign module's targeted audience. The CMS connects to the digital sign module and pushes to it the models and advertising lists suitable tor it.

Referring again to FIG. 4, the Player Specific Model Extractor 435 connects to the data mining module 110, and obtains both the passer pattern and ad category models. These models are segregated per player and sent to digital sign module (digital player) 105. Data mining module 110 provides models that are suitable for the current day and date as well as the current weather, for example, the current day is Friday September 9, 2011, with a forecasted clear morning and a rainy evening. The model extractor 41 5 extracts the ad categories from ad category models and sends such to the ad(vertising) list generator 420 for each digital sign. The models are parsed and an advertisement is selected for each time slot. For example, assuming that the average advertisement duration is 10 seconds, 360 advertisements are selected for each hour.

The ad list generator 420 fetches ads for the categories that are scheduled for a particular day, along with the advertising data. The tentative play list generator module analyzes the ad list and generates a tentative play list that is sent to the advertiser input scheduler. Generator 420 compiles a play list based on arranged advertising categories, and an advertising list. The selection of advertisements is based on the roulette-wheel selection, according to one embodiment, where each advertisement is randomly picked based on a probability. The advertiser input scheduler module 420 fetches advertiser input and incorporates advertiser preferences in the tentative play list to generate the default play list which is sent to the digital sign module.

The ad refresh module 405 checks for new advertisements by comparing the versions maintained in a permanent store, e.g., a database, accessible to the CMS against versions obtained from the advertisements repository. If a new version of an advertisement is found then the actual advertisements (video files) are transferred to the digital sign module. If new ads (ads which were not present earlier in the ad repository) are present then module 405 fetches advertising data from SQL server DB 440 and sends such to the digital sign module 110.

3. Playing playlist with Digital Sign Module

CMS 120 transfers the ad list at 140 to the digital sign module 105. In one embodiment, digital sign module generates a default playlist by extracting file directory path information from the ad list and then retrieving the corresponding advertisements from an advertisements repository 125 that holds the advertisement files. The digital sign module operates in both an online and an offline mode. In the offline mode, the default playlist is played to the digital sign. The playlist for the online mode is generated using the real time VA data described below with reference to FIG. 5 which illustrates the flow of events and information 500 in the digital sign module (digital player) 105.

Figure 5:
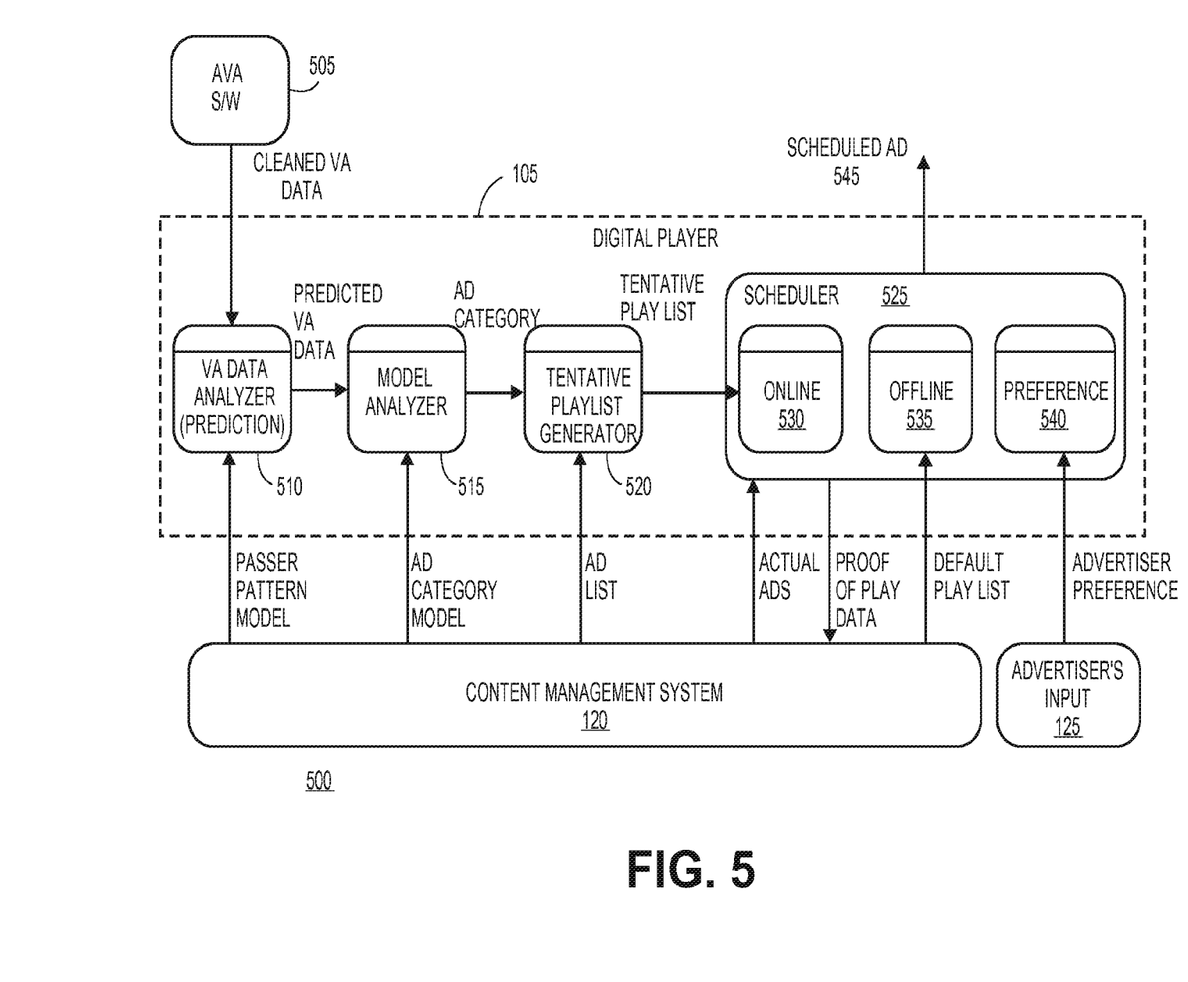
FIG. 5 provides a block diagram of a digital sign module in accordance with an embodiment of the invention.

The video analytic (VA) analyzer (predictor) module 510 fetches real time VA data and retrieves passer pattern models from CMS 120 to predict VA data. The predicted VA data is sent to model analyzer module 515. The model analyzer module 515 receives the predicted. VA data as input and retrieves ad category models from CMS 120 and extracts an advertising category based on the predicted VA data. In one embodiment, confidence values of the passer pattern model and the ad category model are multiplied to generate a multiplied confidence value. If the multiplied confidence value is greater than a threshold, then an advertisement for the extracted advertising category is sent to the tentative play list generator 520, otherwise the digital sign module continues in an offline mode. The tentative play list generator module 520 retrieves an advertising list from CMS 120 and generates the tentative play list by considering the advertising category from the model analyzer and sends the tentative play list to online mode.

Scheduler module 525 contains following three sub modules, an online sub-module that selects an advertisement based on a probability distribution and associates it with an actual advertisement that is then scheduled and sent to display at 545, an offline sub-module that selects an advertisement from a default play list based on the scheduling time and associates it with an actual advertisement that is then scheduled and sent to display at 545, and a preference sub-module that checks for an advertiser preference and schedules an advertiser preferred advertisement for display at 545.

Real Time Content Triggering

According to an embodiment of the invention, viewers are targeted in real time. The real time processing takes place at the digital sign module. Each digital sign module receives both advertising category as well as passer pattern models from the CMS. Broadly speaking, according to one embodiment, a plurality of viewers are detected, the demographics of those viewers are analyzed, and viewing patterns for those viewers is collected. Based thereon, advertisements are targeted to the digital sign module. In one embodiment, the passer pattern model has a parameter referred to as the confidence value that indicates whether to play digital advertisements in online mode or offline mode. Thus, when the AVA data is analyzed in real time mode, the rules from the passer pattern model are chosen and the confidence value attached to these rules is compared with a threshold value. If the confidence value falls short of the threshold, then the default playlist is played, but if the value is the same or greater than the threshold, then the advertisements list is modified and advertisements targeting current viewers are played. After the current advertisement is played, either the digital sign module can return to playing the default playlist or could continue playing targeted advertisements.

Conclusion

In this description, numerous details have been set forth to provide a more thorough explanation of embodiments of the present invention. It should be apparent, however, to one skilled in the art, that embodiments of the present invention may be practiced without these specific details. In other instances, well-known structures and devices have been shown in block diagram form, rather than in detail, in order to avoid obscuring embodiments of the present invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer, Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appear from the description herein. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

What is claimed is:

1. A method for selecting advertising for display on a digital sign, comprising:
   gathering video analytics data by one or more sensors proximate to the digital sign, wherein the video analytics data is associated with a plurality of previous viewers of advertisements displayed on the digital sign;
   anonymizing the video analytics data to create anonymous video analytics data;
   gathering sales data from a point-of-sale terminal;
   analyzing, by one or more processors of a digital advertising system, the gathered video analytics data to determine viewing patterns and demographic characteristics of the previous viewers based on the gathered video analytics data, wherein the viewing patterns include a number of viewers and a distance for each of the viewers to the digital sign;
   determining, by the one or more processors of the digital advertising system, an effectiveness of the advertisements on viewers with similar demographic characteristics making up a demographic group as determined from the video analytics data, wherein the determining of the effectiveness is performed by correlating the sales data from the point-of-sale terminal with the anonymous video analytics data of the demographic group;
   training, by the one or more processors of the digital advertising system, advertising models based on the viewing patterns, the demographic characteristics, weather information, and the effectiveness of the advertisements; and
   selecting, by the one or more processors of the digital advertising system, an advertisement from a plurality of advertisements for display on the digital sign based on the trained advertising models, wherein the advertising models are retrained at periodic time intervals in response to additional viewing patterns and demographic characteristics to refine the advertisement selection.

2. The method of claim 1, wherein selecting the advertisement for display on the digital sign comprises selecting the advertisement for display on the digital sign for viewing by future viewers belonging to a same or similar demographic as the previous viewers.

3. The method of claim 1, further comprising receiving advertiser preferences as to which advertisement to display on the digital sign for viewing by future viewers, and wherein selecting the advertisement for display on the digital sign based on the trained advertising models comprises selecting the advertisement for display based on one or both of the trained advertising models and the advertiser preferences.

4. The method of claim 1, wherein analyzing the gathered video analytics data comprises analyzing the anonymous video analytics data in real-time.

5. The method of claim 1, wherein the video analytics data comprises one or more previous viewer characteristics, the characteristics comprising gender and age.

6. The method of claim 5, wherein the video analytics data further comprises one or more of a date and time, a day-of-the-week, a timeslot, a display location, a viewing time, and an indication of whether the previous viewers are target viewers based on viewer characteristics associated with the previous viewers of advertisements displayed on the digital sign.

7. The method of claim 1, further comprising:
   receiving advertising data corresponding to the advertisements displayed on the digital sign;
   and wherein training advertising models based on the viewing patterns comprises training advertising models based on one or both of the viewing patterns and the advertising data.

8. The method of claim 7, wherein the advertising data comprises a date and time, a display location, an ad category, and a duration or length for each advertisement displayed on the digital sign.

9. The method of claim 1, further comprising:
   gathering weather data corresponding to a time during which the advertisements were displayed on the digital sign; and wherein training advertising models based on the viewing patterns comprises training advertising models based on one or both of the viewing patterns and the weather data.

10. The method of claim 1 further comprising:
    receiving point-of-sale data; and
    correlating the viewing patterns with the point-of-sale data to determine an effect of the advertisements displayed on the digital sign on a sale of a product or service identified in the advertisements.

11. The method of claim 1, further comprising displaying the selected advertisement on the digital sign.

12. A digital advertising system, comprising:
    an input to receive a plurality of digital advertisements;
    an output via which to transmit the digital advertisements for display on a digital sign module;
    one or more sensors located proximate to the digital sign module;
    one or more processors;
    a data mining module executed by the one or more processors and the data mining module to couple to the digital sign module to:
       retrieve video analytics data relating to a plurality of previous viewers of the digital advertisements displayed on the digital sign;
       anonymize the video analytics data to create anonymous video analytics data;
       gather sales data from a point-of-sale terminal;
       determine demographic characteristics of the previous viewers making up a demographics group as determined from the video analytics data, determine an effectiveness of the digital advertisements based on the video analytics data including viewing patterns of the viewers having a number of viewers and a distance for each of the viewers to the digital sign and a correlation of the sales data from the point-of-sale terminal with the anonymous video analytics data of the demographic group; and
       generate trained advertising models based on the video analytics data, demographic characteristics, weather information, and the effectiveness of the digital advertisements according to a data mining algorithm, wherein the video analytics data is generated by the one or more sensors; and
    a content management system module executed by the one or more processors and the content management system module being coupled to the data mining module to receive the trained advertising models, and to the input to receive the plurality of digital advertisements, the content management system to generate and transmit to the digital sign module a subset of the plurality of advertisements for display based on the trained advertising models and the plurality of digital advertisements, wherein the advertising models are retrained at periodic time intervals in response to additional viewing patterns and demographic characteristics to refine the transmitted subset of advertisements.

13. The digital advertising system of claim 12, further comprising an advertisements module coupled to the input to provide the plurality of digital advertisements.

14. The digital advertising system of claim 12 further comprising the digital sign module coupled to the output to receive the digital advertisements, the digital sign module to display the digital advertisements and to capture and transmit to a permanent store the video analytics data.

15. The digital advertising system of claim 14, further comprising the data mining module coupled to the permanent store to retrieve the video analytics data.

16. An apparatus including a non-transitory computer readable medium which contains instructions that when executed by one or more processors of a computer, cause the computer to perform the following operations:
   gathering video analytics data by one or more sensors proximate to a digital sign, wherein the video analytics data is associated with a plurality of previous viewers of advertisements displayed on the digital sign;
   analyzing the gathered video analytics data to determine viewing patterns and demographic characteristics of the previous viewers based on the gathered video analytics data, wherein the viewing patterns include a number of viewers and a distance for each of the viewers to the digital sign;
   anonymizing the video analytics data to create anonymous video analytics data;
   gathering sales data from a point-of-sale terminal;
   determining an effectiveness of the advertisements on viewers with similar demographic characteristics making up a demographics group as determined from the video analytics data, and wherein determining the effectiveness is made by correlating the sales data from the point-of-sale terminal with the anonymous video analytics data of the demographic group;
   training advertising models based on the viewing patterns, the demographic characteristics, weather information, and the effectiveness of the advertisements; and
   selecting an advertisement from a plurality of advertisements for display on the digital sign based on the trained advertising models, wherein the advertising models are retrained at periodic time intervals in response to additional viewing patterns and demographic characteristics to refine the advertisement selection.

17. The apparatus of claim 16, wherein the medium contains further instructions that when executed by the computer cause the computer to perform the operation of receiving advertiser preferences as to which advertisement to display on the digital sign for viewing by future viewers, and wherein selecting the advertisement for display on the digital sign based on the trained advertising models comprises selecting the advertisement for display based on one or both of the trained advertising models and the advertiser preferences.

18. The apparatus of claim 16, wherein the video analytics data comprises one or more previous viewer characteristics, the characteristics comprising gender and age.

19. The apparatus of claim 18, wherein the video analytics data further comprises one or more of a date and time, a day-of-the-week, a times lot, a display location, a viewing time, and an indication of whether the previous viewers are target viewers based on viewer characteristics associated with the previous viewers of advertisements displayed on the digital sign.

20. The apparatus of claim 16, wherein the medium contains further instructions that when executed by the computer cause the computer to perform the following operation:
   receiving advertising data corresponding to the advertisements displayed on the digital sign;
   and wherein training advertising models based on the viewing patterns comprises training advertising models based on one or both of the viewing patterns and the advertising data.

* * * * *

UNITED STATES PATENT AND TRADEMARK OFFICE
CERTIFICATE OF CORRECTION

PATENT NO. : 10,977,692 B2  
APPLICATION NO. : 15/268152  
DATED : April 13, 2021  
INVENTOR(S) : Kuzma et al.

Page 1 of 1

It is certified that error appears in the above-identified patent and that said Letters Patent is hereby corrected as shown below:

On the Title Page

Item (72), in "Inventors", in Column 1, Line 1, delete "Portland," and insert --Hillsboro,-- therefor Item (72), in "Inventors", in Column 1, Line 2, delete "Sixmilebridge (RO);" and insert --Co. Clare (IE);-- therefor Item (72), in "Inventors", in Column 1, Line 4, delete "Markham" and insert --Ottawa-- therefor Item (72), in "Inventors", in Column 1, Line 8, delete "Hyderabad" and insert --Bangalore,-- therefor In the Claims In Column 14, Line 3, in Claim 7, after "sign;", insert --and--

In Column 14, Line 4, in Claim 7, before "wherein", delete "and"

In Column 14, Line 15, in Claim 9, after "sign; and", insert --a linebreak--

In Column 16, Line 35, in Claim 20, after "sign;", insert --and--

In Column 16, Line 36, in Claim 20, before "wherein", delete "and"

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*